US009240698B2

(12) United States Patent
Lee et al.

(10) Patent No.: US 9,240,698 B2
(45) Date of Patent: Jan. 19, 2016

(54) SWITCHING POWER SUPPLY DEVICE AND BATTERY CHARGER INCLUDING THE SAME

(71) Applicant: Hyundai Motor Company, Seoul (KR)

(72) Inventors: Woo Young Lee, Chungcheongbuk-do (KR); Byeong Seob Song, Yongin-si (KR); Dae Woo Lee, Gyeongsangbuk-do (KR); Jin Young Yang, Hanam-si (KR); Jong Pill Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 215 days.

(21) Appl. No.: 14/103,634

(22) Filed: Dec. 11, 2013

(65) Prior Publication Data

US 2015/0102765 A1 Apr. 16, 2015

(30) Foreign Application Priority Data

Oct. 10, 2013 (KR) ........................ 10-2013-0120886

(51) Int. Cl.
*H02J 7/00* (2006.01)
*H02M 3/335* (2006.01)
*H02M 1/34* (2007.01)

(52) U.S. Cl.
CPC .............. *H02J 7/0052* (2013.01); *H02M 1/34* (2013.01); *H02M 3/33546* (2013.01); *H02M 3/33569* (2013.01); *H02J 2007/0059* (2013.01); *H02M 2001/346* (2013.01)

(58) Field of Classification Search
CPC ...... Y02E 60/12; H02J 7/0042; H02J 7/0045; H01M 10/46; H01M 10/44
USPC ........................................ 320/107
See application file for complete search history.

(56) References Cited

U.S. PATENT DOCUMENTS

| 4,953,068 A | * | 8/1990 | Henze | ............... | H02M 3/33584 |
| | | | | | 363/127 |
| 5,781,419 A | * | 7/1998 | Kutkut | .............. | H02M 3/33569 |
| | | | | | 363/132 |

(Continued)

FOREIGN PATENT DOCUMENTS

| JP | 09-285126 A | 10/1997 |
| JP | 2003-070248 A | 3/2003 |

(Continued)

OTHER PUBLICATIONS

Korean Notice of Allowance issued in Application No. 10-2013-0120886 dated Aug. 10, 2015.

*Primary Examiner* — Arun Williams
(74) *Attorney, Agent, or Firm* — McDermott Will & Emery LLP

(57) ABSTRACT

A switching power supply device includes a full-bridge circuit comprising a plurality of switching devices, a transformer comprising a primary coil and a secondary coil, the primary coil being connected to an output of the full-bridge circuit, and a DC/DC converter comprising a rectifier circuit. The rectifier circuit includes a plurality of diodes and is connected to the secondary coil to rectify a voltage outputted from the secondary coil. A snubber circuit includes a first snubber diode connected to an intermediate point of the secondary coil, a second snubber diode connected in series with the first snubber diode, the second snubber diode being connected to one end of an output capacitor, and a snubber capacitor connected between a node between the first and second snubber diodes and a positive side output of the rectifier circuit.

13 Claims, 8 Drawing Sheets

(56) References Cited

U.S. PATENT DOCUMENTS

| | | | | |
|---|---|---|---|---|
| 6,002,596 | A | * | 12/1999 | Mayer ............... H02M 1/40 363/21.04 |
| 6,115,271 | A | * | 9/2000 | Mo ................... H02M 1/34 363/21.12 |
| 2012/0249059 | A1 | * | 10/2012 | Matsumae ......... H02M 3/337 320/107 |

FOREIGN PATENT DOCUMENTS

| | | |
|---|---|---|
| JP | 2006-211878 A | 8/2006 |
| JP | 2011-041387 A | 2/2011 |
| JP | 2012-152043 A | 8/2012 |
| JP | 2012-175819 A | 9/2012 |

* cited by examiner

SWITCHING POWER SUPPLY DEVICE AND BATTERY CHARGER INCLUDING THE SAME

CROSS-REFERENCE TO RELATED APPLICATION

The present application claims priority to Korean Patent Application No. 10-2013-0120886 filed on Oct. 10, 2013, the entire contents of which is incorporated herein for all purposes by this reference.

BACKGROUND OF THE INVENTION

1. Technical Field

The present disclosure relates, in general, to a switching power supply device and a battery charger including the same, and, more particularly, to a switching power supply device which can effectively reduce voltage spikes of a rectifier in a high-voltage output circuit, and a battery charger including the same.

2. Description of the Related Art

In switching power supply devices using a snubber capacitor, a leakage inductance component of a transformer may be interlocked with a parasitic capacitor of a diode rectifier device, thereby generating resonance or a voltage spike. Such a voltage spike may lead to destruction of a system.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a switching power supply device which can reduce spike voltages generated from a diode rectifier and enable zero voltage switching between switching devices and a method of driving the same device.

In order to achieve the above object, according to one aspect of the present invention, there is provided a switching power supply device that includes: a full-bridge circuit comprising a plurality of switching devices; a transformer comprising a primary coil and a secondary coil, the primary coil being connected to an output of the full-bridge circuit; a direct current/direct current (DC/DC) converter comprising a rectifier circuit, wherein the rectifier circuit comprises a plurality of diodes and is connected to the secondary coil to rectify a voltage outputted from the secondary coil; and a snubber circuit comprising a first snubber diode connected to an intermediate point of the secondary coil, a second snubber diode connected in series with the first snubber diode, the second snubber diode being connected to one end of an output capacitor, and a snubber capacitor connected between a node between the first and second snubber diodes and a positive side output of the rectifier circuit.

According to an embodiment of the invention, the plurality of switching devices may include a first switching section including a first switching device and a second switching device which are connected in series with each other, and a second switching section including a third switching device and a fourth switching device which are connected in series with each other. The first and second switching sections may be connected in parallel to each other. The first and third switching devices may form an upper arm, and the second and fourth switching devices may form a lower arm. One end of the primary coil may be connected to a first node between the first and second switching devices, and the other end of the primary coil may be connected to a second node between the third and fourth switching devices.

The plurality of diodes included in the rectifier circuits may include a first diode section including a first diode and a third diode which are connected in series with each other and a second diode section including a second diode and a fourth diode which are connected in series with each other. The first and second diode sections may be connected in parallel to each other. The first and second diodes may form an upper arm, and the third and fourth diodes may form a lower arm. One end of the secondary coil may be connected to a third node between the first and third diodes, and the other end of the secondary coil may be connected to a fourth node between the second and fourth diodes.

When a voltage is induced to the primary coil in response to opening/closing of the switching devices, the voltage stored in the snubber capacitor may be reduced, and the current flowing through the first snubber diode may be reduced.

When the secondary coil and the rectifier circuit are in a steady state after the voltage is induced to the primary coil in response to the opening/closing of the switching devices, the first snubber diode, the second snubber diode and the snubber capacitor may be in an open state.

A spike voltage generated at the positive side output of the rectifier circuit may be stored in the snubber capacitor.

An anode of the first snubber diode may be connected to an intermediate point of the secondary coil, and a cathode of the first snubber diode may be connected to the anode of the second snubber diode and one end of the snubber capacitor. A cathode of the second snubber diode may be connected to one end of the output capacitor. The other end of the snubber capacitor may be connected to the positive side output of the rectifier circuit.

When the snubber capacitor performs a charging operation, the snubber capacitor and the second snubber diode may be connected in series with each other and in parallel to an output inductor which stabilizes a voltage rectified by the rectifier circuit.

According to another aspect of the present invention, there is provided a switching power supply device that includes a full-bridge circuit comprising a first series connection which includes a first switching device and a second switching device and a second series connection which includes a third switching device and a fourth switching device; a transformer comprising a primary coil and a secondary coil, one end of the primary coil being connected between the first and second switching devices, and the other end of the primary coil being connected between the third and fourth switching devices; a rectifier circuit comprising a third series connection which includes a first diode and a third diode and a fourth series connection which includes a second diode and a fourth diode, the rectifier circuit being connected to the secondary coil to rectify a voltage outputted from the secondary coil; and a snubber circuit comprising a first snubber diode connected to an intermediate point of the secondary coil, a second snubber diode connected in series to the first snubber diode, the second snubber diode being connected to one end of an output capacitor, and a snubber capacitor connected between a node between the first and second snubber diodes and a positive side output of the rectifier circuit. The first series connection, the second series connection, the third series connection and the fourth series connection may be connected in parallel to each other. The first and third switching devices and the first and second diodes may be paired to form an upper arm, and the second and fourth switching devices and the third and fourth diodes may be paired to form a lower arm. One end of the secondary coil may be connected between the first and second diodes, and the other end of the secondary coil may be connected to between the third and fourth diodes.

When only the second and fourth switching devices are turned on, the third and fourth diodes may conduct current, whereby current flowing through the third diode and the fourth diode flows to the first snubber diode. When the second switching device is turned on and the first switching device is turned off, the first and fourth diodes may conduct current, the voltage charged in the first snubber capacitor may be reduced, and simultaneously, the amount of current that conducts through the first snubber diode may be reduced. The first snubber diode may be short-circuited while the amount of current that conducts through the first snubber diode is being reduced, and the second snubber diode may conduct current when charging of the snubber capacitor is started.

When the second snubber diodes conducts current and charging of the snubber capacitor is completed, the fourth switching device may be turned off and the third switching device may be turned on so that a current induced in the primary coil is fed back.

When only the first and third switching devices are turned on, the first and second diodes may conduct current. When the first switching device is turned off and the second switching device is turned on, the second and third diodes may conduct current, the voltage charged in the first snubber capacitor may be reduced, and simultaneously, the amount of current that conducts through the first snubber diode may be reduced. The first snubber diode may be short-circuited while the amount of current that conducts through the first snubber diode is being reduced, and the second snubber diode may conduct current when charging of the snubber capacitor is started.

According to a further aspect of the present invention, there is provided the above-described switching power supply device and an alternating current/direct current (AC/DC) converter connected to an alternating power supply, wherein the AC/DC converter rectifies AC power into DC direct current power and supplies the rectified DC power to an input of the DC/DC converter.

The switching power supply device and the method of driving the same switching power supply device according to an embodiment of the invention can reduce spike voltages generated at the output of a diode rectifier.

In addition, since a feedback segment for current from the transformer is provided, zero voltage switching of the switching devices inside the DC/DC converter can be enabled, thereby improving the efficiency of a system.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
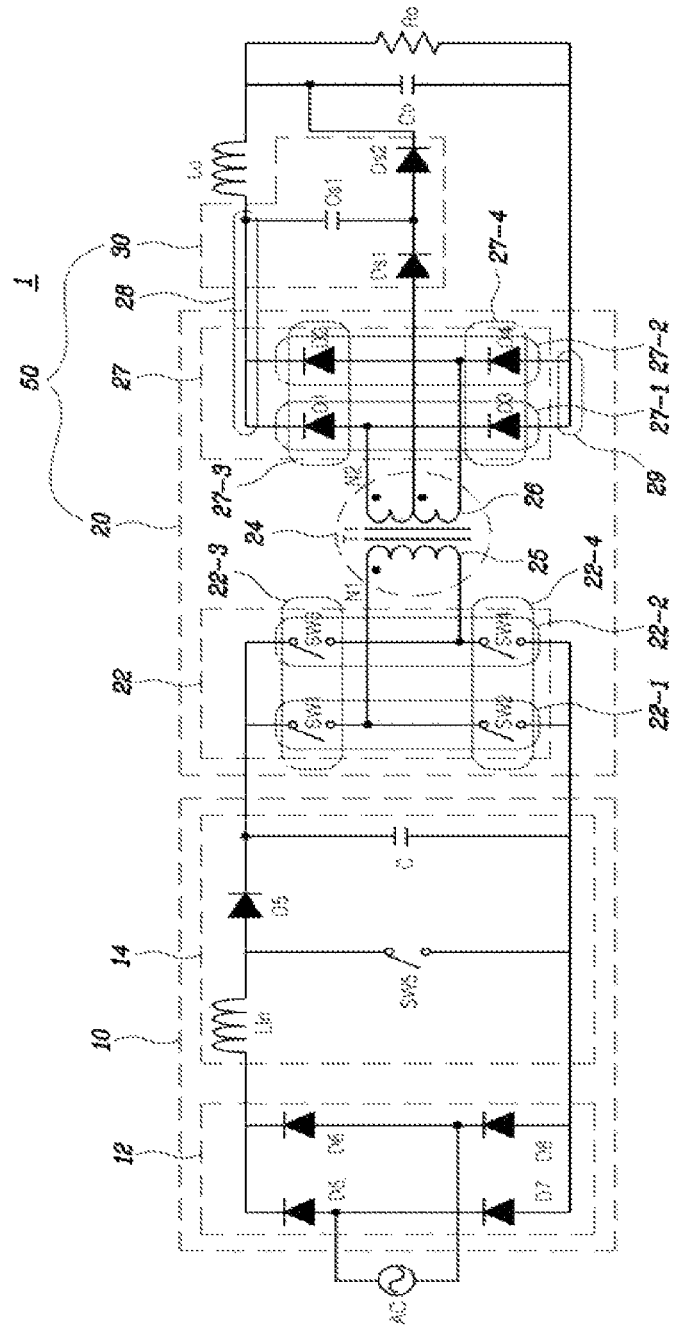
FIG. 1 is a circuit diagram schematically showing a battery charger including a switching power supply device according to an embodiment of the present invention.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

FIG. 1 is a circuit diagram schematically showing a battery charger including a switching power supply device according to an embodiment of the present invention. As shown in FIG. 1, the battery charger 1 according to this embodiment includes an alternating current/direct current (AC/DC) converter 10 and a switching power supply device 50 including a DC/DC converter 20 and a snubber circuit 30.

The battery charger 1 is a device which charges a resistor Ro which is disposed in an electric vehicle, a hybrid vehicle, a fuel cell vehicle, or the like. The AC/DC converter 10 includes a rectifier circuit 12 and a power factor correction circuit 14 which are connected to an alternating current supply AC. The rectifier circuit 12 includes a plurality of diodes D5 to D8, and the power factor correction circuit 14 includes a choke coil Lin, a diode D5 for preventing discharge, and a smoothing capacitor C for correcting a power factor. The AC/DC converter 10 can supply a rectified DC voltage to the DC/DC converter 20.

The switching power supply device 50 according to this embodiment is connected between the resistor Ro and the AC/DC converter 10, and includes a full-bridge circuit 22, a transformer 24, a rectifier circuit 27, an output inductor Lo and an output capacitor Co. The output inductor Lo and the output capacitor Co are smoothing reactors which can form a filter.

The full bridge circuit 22 includes a plurality of switching devices SW1 to SW4. The plurality of switching devices SW1 to SW4 include a first switching section 22-1 including the first and second switching devices SW1 and SW2 which are connected in series with each other and a second switching section 22-2 including the third and fourth switching devices SW3 and SW4 which are connected in series with each other. The first and second switching sections 22-1 and 22-2 are connected in parallel to each other. The first and third switching devices SW1 and SW3 form an upper arm 22-3, and the second and fourth switching devices SW2 and SW4 form a lower arm 22-4. One end of a primary coil 25 is connected to a first node between the first and second switching devices SW1 and SW2, and the other end of the primary coil 25 is connected to a second node between the third and fourth switching devices SW3 and SW4.

Specifically, the full-bridge circuit 22 includes a first series connection of the first and second switching devices SW1 and SW2, i.e. the first switching section 22-1 in which the first and second switching devices SW1 and SW2 are connected in series with each other, and a second series connection of the third and fourth switching devices SW3 and SW4, i.e. the second switching section 22-2 in which the third and fourth switching devices SW3 and SW4 are connected in series with each other. The first series connection, i.e. the first switching section 22-1, and the second series connection, i.e. the second switching section 22-2, are connected in parallel to each other.

The transformer 24 includes the primary coil 25 and a secondary coil 26. One end of the primary coil 25 is connected between the first and second switching devices SW1 and SW2, and the other end of the primary coil 25 is connected between the third and fourth switching devices SW3 and SW4.

The rectifier circuit 27 includes a positive side output 28 and a negative side output 29. The rectifier circuit 27 is connected to the secondary coil 26 of the transformer 24, and rectifies a voltage outputted from the secondary coil 26.

A plurality of diodes D1 to D4 included in the rectifier circuit 27 include a first diode section 27-1 including first and third diodes D1 and D3 which are connected in series with each other and a second diode section 27-2 including second and fourth diodes D2 and D4. The first and second diode sections 27-1 and 27-2 are connected in parallel to each other. The first and second diodes D1 and D2 form an upper arm 27-3, and the third and fourth diodes D3 and D4 form a lower arm 27-4. One end of the secondary coil 26 is connected to a third node between the first and third diodes D1 and D3, and the other end of the secondary coil 26 is connected to a fourth node between the second and fourth diodes D2 and D4.

Specifically, the rectifier circuit 27 includes a third series connection of the first and third diodes D1 and D3, i.e. the first diode section 27-1 in which the first and third diodes D1 and D3 are connected in series with each other, and a fourth series connection of the second and fourth diodes D2 and D4, i.e. the second diode section 27-2 in which the second and fourth diodes D2 and D4 are connected in series with each other. The third series connection, i.e. the first diode section 27-1, and the fourth series connection, i.e. the second diode section 27-2, are connected in parallel to each other. One end of the secondary coil 26 is connected between the first and second diodes D1 and D2, and the other end of the secondary coil 26 is connected between the third and fourth diodes D3 and D4.

The snubber circuit 30 includes a snubber capacitor Cs1, a first snubber diode Ds1 and a second snubber diode Ds2. The snubber capacitor Cs1 is connected between a node between the first and second snubber diodes Ds1 and Ds2 and the positive side output 28 of the rectifier circuit 27. The first snubber diode Ds1 is connected to an intermediate point of the secondary coil 26, and the second snubber diode Ds2 is connected in series to the first snubber diode Ds1 and to one end of the output capacitor Co. Specifically, one end of the snubber capacitor Cs1 is connected to the positive side output of the rectifier circuit 27 and one end of the output inductor Lo, and the other end of the snubber capacitor Cs1 is connected to a node between a cathode of the first snubber diode Ds1 and an anode of the second snubber diode Ds2. The anode of the first snubber diode Ds1 is connected to an intermediate point of the secondary coil 26 of the transformer 24, and the cathode of the first snubber diode Ds1 is connected to the other end of the snubber capacitor Cs1 and the anode of the second snubber diode Ds2. The anode of the second snubber diode Ds2 is connected to the cathode of the first snubber diode Ds1 and the cathode of the snubber capacitor Cs1, and the cathode of the second snubber diode Ds2 is connected to a node between the output inductor Lo and the output capacitor Co.

The output inductor Lo and the output capacitor Co can smooth a voltage rectified by the rectifier circuit 27. One end of the output inductor Lo is connected to the positive side output end 28 and the snubber capacitor Cs1, and the other end of the output inductor Lo is connected to the resistor Ro, the output capacitor Co and the second snubber diode Ds2.

When a voltage is induced in the primary coil 25 in response to opening/closing of the switching devices SW1 to SW4 which form the full-bridge circuit 22, the voltage charged in the snubber capacitor Cs1 can be reduced and current flowing through the first snubber diode Ds1 can be reduced.

After the primary coil 25 is induced with a voltage in response to opening/closing of the switching devices SW1 to SW4, when the secondary coil 26 and the rectifier circuit 27 are in a steady state, the first snubber diode Ds1, the second snubber diode Ds2 and the snubber capacitor Cs1 can be in an open state.

A spike voltage generated at the positive side output 28 of the rectifier circuit 27 can be stored in the snubber capacitor Cs1. That is, the snubber capacitor Cs1 can perform a full charging operation by storing and discharging voltage generated by a voltage spike.

While the snubber capacitor Cs1 performs the full charging operation, the snubber capacitor Cs1 and the second snubber diode Ds2 can be connected in series with each other and in parallel to the output inductor Lo which stabilizes a voltage rectified by the rectifier circuit 27.

FIGS. 2 to 6 are circuit diagrams showing the time series operation of the switching power supply device according to an embodiment of the present invention.

Figure 2:
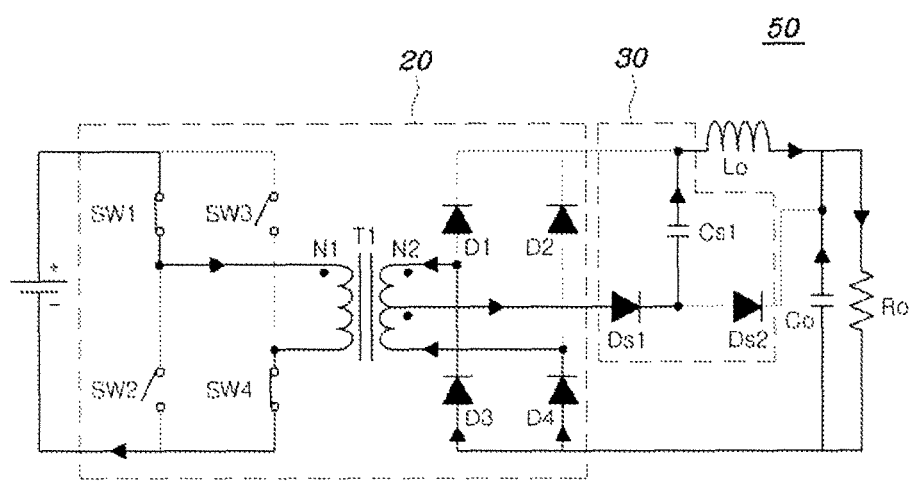
FIG. 2 to FIG. 6 are circuit diagrams showing the time series operation of the switching power supply device according to an embodiment of the present invention.

First, referring to FIG. 2, the first switching device SW1 and the fourth switching device SW4 are in a turned-on state, and a voltage is being induced to the primary coil 25 of the transformer 24 by a DC supply, i.e. an input power supply.

Specifically, when the second switching device SW2 and the fourth switching device SW4 are in a turned-on state before the first switching device SW1 is turned on, current flowing toward the secondary coil 26 driven by the voltage that was previously charged in the snubber capacitor Cs1 causes an induction current in one enclosed circuit composed of the second and fourth switching devices SW2 and SW4 and the primary coil 25. At this time, the third diode D3 and the fourth diode D4 are in a current-conducting state. Then, when the first switching device SW1 is turned on, voltage is induced from the input power supply into the primary coil 25 of the transformer 24. When the voltage is induced in the primary coil 25, a voltage is also induced in the secondary coil 26 by the ratio of turns $N_1/N_2$.

Figure 3:
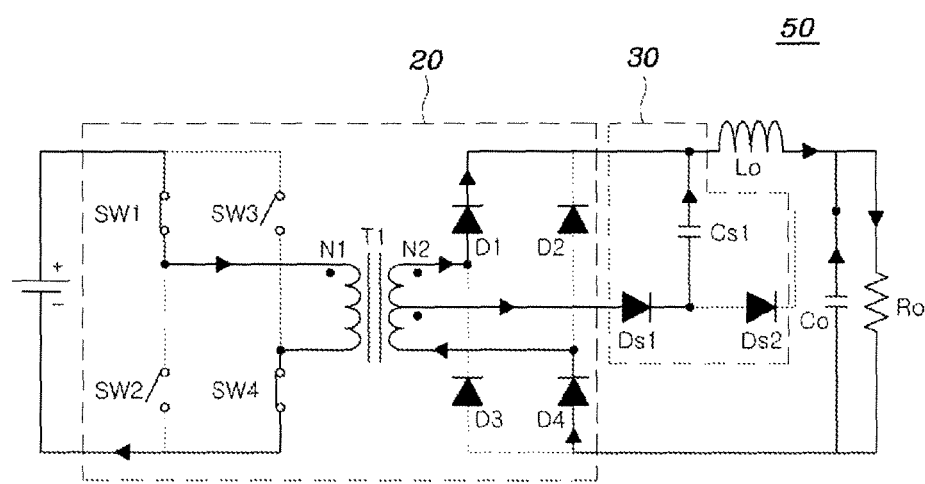

As shown in FIG. 3, when a voltage induced in the secondary coil 26, a positive (+) voltage is induced in the cathode side of the third diode D3 and the anode side of the first diode D1, and a negative (−) voltage is induced in the cathode side of the fourth diode D4 and the anode side of the second diode D2. Neither the second diode D2 nor the third diode D3 conducts current, whereas the first diode D1 and the fourth diode D4 conduct current. A voltage charged in the snubber capacitor Cs1 causes the current to conduct through the fourth diode D4 except for a current component leaking from the first diode D1 to conduct through the first snubber diode Ds1. As the voltage is discharged from the snubber capacitor Cs1, the amount of a current flowing through the first snubber diode Ds1 is reduced, whereas the amount of current flowing to the first diode D1 is relatively increased.

Figure 4:
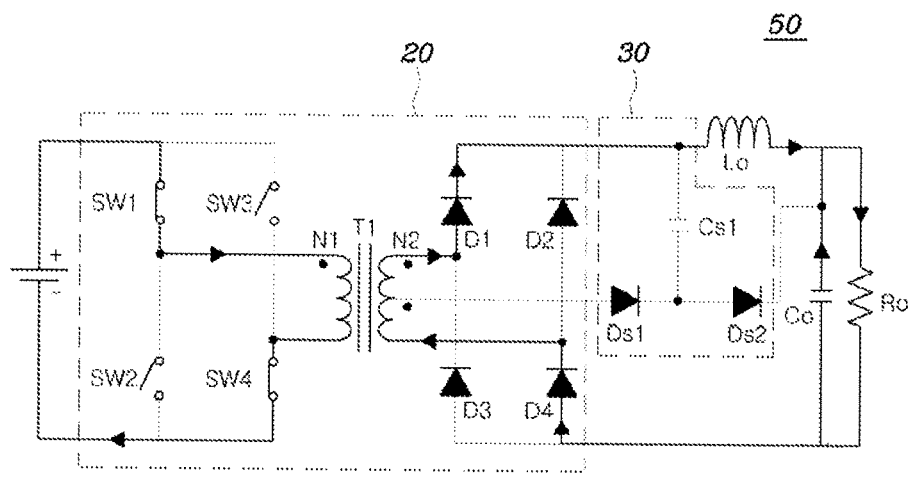

As shown in FIG. 4, as all of the voltage stored in the snubber capacitor Cs1 is discharged, the amount of current induced to the first snubber diode Ds1 becomes 0. At this time, the amount of current induced to the snubber capacitor Cs1, the first snubber diode Ds1 and the second snubber diode Ds2 becomes 0.

Figure 5:
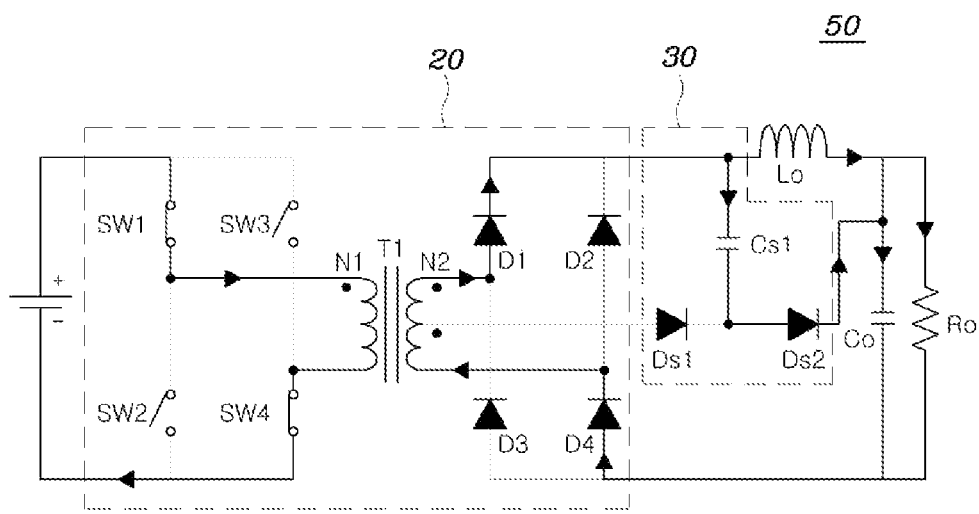

Referring to FIG. 5, when the fourth switching device SW4 is turned on, a spike voltage is generated at the positive side output 28 of the rectifier circuit 27. When the spike voltage is generated, the snubber capacitor Cs1 can start a charging operation. As the charging operation is started, current flows from the snubber capacitor Cs1 to the second snubber diode Ds2, so that the current that passes through the output inductor Lo and the current that passes through the second snubber diode Ds2 flow through the output capacitor Co. The current flowing through the second snubber diode Ds2 is identical to the current that is charged in the snubber capacitor Cs1.

Figure 6:
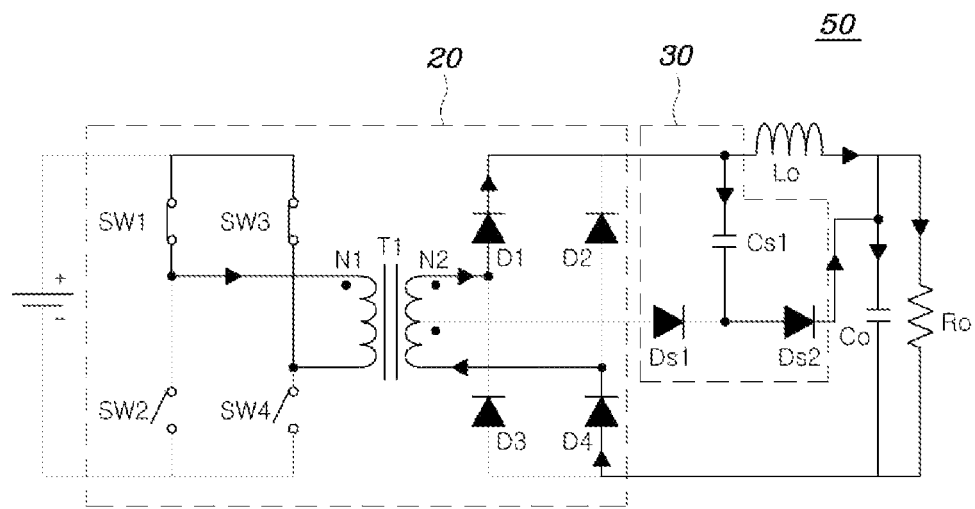

Referring to FIG. 6, the fourth switching device SW4 is turned off and the third switching device SW3 is turned off, so that a feedback segment including the primary coil 25 is formed. This is because an induced current is generated by the primary coil 25 through the transformer 24 in order to maintain current in the output inductor Lo. Afterwards, when the first switching device SW1 is turned off and the second switching device SW2 is turned on, the primary coil 25 is induced with voltage in the direction opposite to the direction of voltage when the first switching device SW1 and the fourth switching device SW4 are turned on. Depending on the direction of voltage induced to the secondary coil 26, the second diode D2 and the third diode D3 conduct a current, and current of the first diode D1 is gradually reduced to 0. In addition, as the voltage is discharged from the snubber capacitor Cs1, the magnitude of the current flowing through the second diode D2 is increased, and the magnitude of current flowing through the first snubber diode Ds1 is reduced. These correspond to the steps illustrated in FIG. 3 and FIG. 4, and afterwards, the same process is repeated.

Figure 7A:
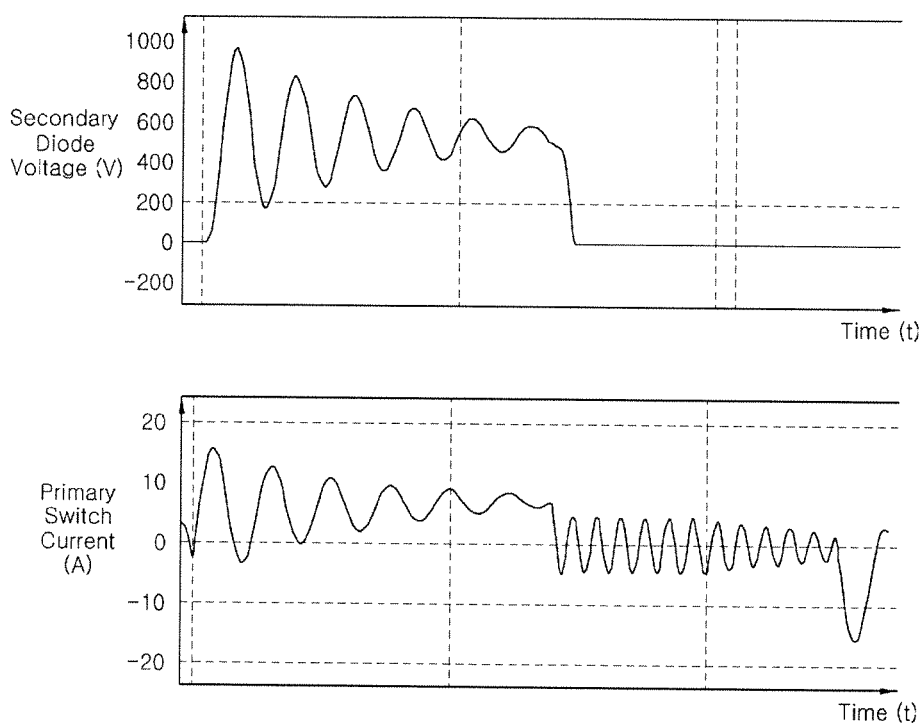
FIG. 7A and FIG. 7B are graphs showing experimental data from cases where a snubber circuit according to an embodiment of the present invention is included and not included, respectively.
Figure 7B:
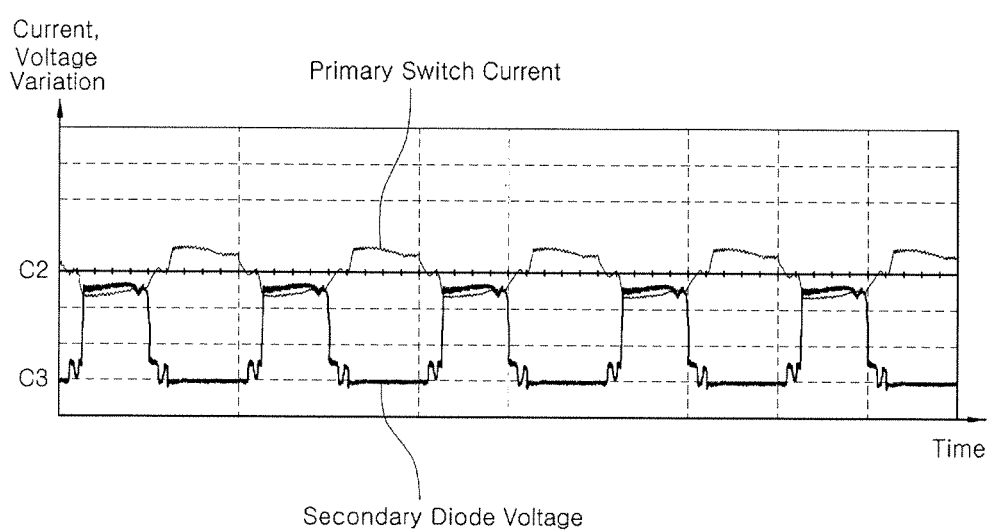

FIGS. 7A and 7B are graphs showing experimental data from cases where a snubber circuit according to an embodiment of the present invention is included and not included, respectively.

FIG. 7A shows variations in primary switch current and secondary diode voltage when the switching power supply device 50 does not include the snubber circuit 30 according to an embodiment of the present invention, whereas FIG. 7B shows variations in a primary switch current and a secondary switch current when the switching power supply device 50 includes the snubber circuit 30 according to the embodiment of the present invention. The primary switch current is the current that flows through switches connected to a primary coil of the transformer 24, whereas the secondary diode voltage is the voltage that is induced to diodes connected to a secondary coil of the transformer 24.

As shown in FIG. 7A, a resonant spike voltage is generated at the positive side output 28 of the rectifier circuit 27, thereby exhibiting a voltage close to 1000 V. In addition, at the primary full-bridge circuit 22 of the transformer 24, the current continues to resonate without reaching a steady state. Accordingly, switching devices and diodes may become destroyed. In contrast, in the case of the switching power supply device 50 having the snubber circuit 30, as shown in FIG. 7B, no spike voltage is generated at the positive side output 28 of the rectifier circuit 27, and current flowing through the primary full-bridge circuit 22 of the transformer 24 does not resonate.

Although the exemplary embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A switching power supply device comprising:
   a full-bridge circuit comprising a plurality of switching devices;
   a transformer comprising a primary coil and a secondary coil, the primary coil being connected to an output of the full-bridge circuit;
   a DC/DC converter comprising a rectifier circuit, wherein the rectifier circuit comprises a plurality of diodes and is connected to the secondary coil to rectify a voltage outputted from the secondary coil; and
   a snubber circuit comprising a first snubber diode connected to an intermediate point of the secondary coil, a second snubber diode connected in series with the first snubber diode, the second snubber diode being connected to one end of an output capacitor, and a snubber capacitor connected between a node between the first and second snubber diodes and a positive side output of the rectifier circuit.

2. The switching power supply device according to claim 1, wherein
the plurality of switching devices comprises a first switching section including a first switching device and a second switching device which are connected in series with each other and a second switching section including a third switching device and a fourth switching device which are connected in series with each other,
the first and second switching sections are connected in parallel to each other,
the first and third switching devices form an upper arm, and the second and fourth switching devices form a lower arm, and
one end of the primary coil is connected to a first node between the first and second switching devices, and the other end of the primary coil is connected to a second node between the third and fourth switching devices.

3. The switching power supply device according to claim 1, wherein
the plurality of diodes included in the rectifier circuits comprises a first diode section including a first diode and a third diode which are connected in series with each other and a second diode section including a second diode and a fourth diode which are connected in series with each other,
the first and second diode sections are connected in parallel to each other,
the first and second diodes form an upper arm, and the third and fourth diodes form a lower arm, and
one end of the secondary coil is connected to a third node between the first and third diodes, and the other end of the secondary coil is connected to a fourth node between the second and fourth diodes.

4. The switching power supply device according to claim 1, wherein, when a voltage is induced to the primary coil in response to opening/closing of the switching devices, a voltage stored in the snubber capacitor is reduced, and a current flowing through the first snubber diode is reduced.

5. The switching power supply device according to claim 1, wherein, when the secondary coil and the rectifier circuit are in a steady state after the voltage is induced to the primary coil in response to the opening/closing of the switching devices, the first snubber diode, the second snubber diode and the snubber capacitor are in an open state.

6. The switching power supply device according to claim 1, wherein a spike voltage generated at the positive side output of the rectifier circuit is stored in the snubber capacitor.

7. The switching power supply device according to claim 1, wherein
an anode of the first snubber diode is connected to an intermediate point of the secondary coil, and a cathode of the first snubber diode is connected to the anode of the second snubber diode and one end of the snubber capacitor,
a cathode of the second snubber diode is connected to one end of the output capacitor, and
the other end of the snubber capacitor is connected to the positive side output of the rectifier circuit.

8. The switching power supply device according to claim 1, wherein, when the snubber capacitor performs a charging operation, the snubber capacitor and the second snubber diode are connected in series with each other and in parallel to an output inductor which stabilizes a voltage rectified by the rectifier circuit.

9. A switching power supply device comprising:
a full-bridge circuit comprising a first series connection which includes a first switching device and a second switching device and a second series connection which includes a third switching device and a fourth switching device;
a transformer comprising a primary coil and a secondary coil, one end of the primary coil being connected between the first and second switching devices, and the other end of the primary coil being connected between the third and fourth switching devices;
a rectifier circuit comprising a third series connection which includes a first diode and a third diode and a fourth series connection which includes a second diode and a fourth diode, the rectifier circuit being connected to the secondary coil to rectify a voltage outputted from the secondary coil; and
a snubber circuit comprising a first snubber diode connected to an intermediate point of the secondary coil, a second snubber diode connected in series with the first snubber diode, the second snubber diode being connected to one end of an output capacitor, and a snubber capacitor connected between a node between the first and second snubber diodes and a positive side output of the rectifier circuit, wherein
the first series connection, the second series connection, the third series connection and the fourth series connection are connected in parallel to each other,
the first and third switching devices and the first and second diodes are paired to form an upper arm, and the second and fourth switching devices and the third and fourth diodes are paired to form a lower arm, and
one end of the secondary coil is connected between the first and second diodes, and the other end of the secondary coil is connected to between the third and fourth diodes.

10. The switching power supply device according to claim 9, wherein,
when only the second and fourth switching devices are turned on, the third and fourth diodes conduct current, whereby the current flowing through the third diode and the fourth diode flows to the first snubber diode,
when the second switching device is turned on and the first switching device is turned off, the first and fourth diodes conduct current, a voltage charged in the first snubber capacitor is reduced, and simultaneously, an amount of current that conducts through the first snubber diode is reduced, and
the first snubber diode is short-circuited while the amount of current that conducts through the first snubber diode is being reduced, and the second snubber diode conducts current when charging of the snubber capacitor is started.

11. The switching power supply device according to claim 10, wherein, when the second snubber diodes conduct current and the charging of the snubber capacitor is completed, the fourth switching device is turned off and the third switching device is turned on so that current induced to the primary coil is fed back.

12. The switching power supply device according to claim 9, wherein,
when only the first and third switching devices are turned on, the first and second diodes conduct a current,
when the first switching device is turned off and the second switching device is turned on, the second and third diodes conduct a current, a voltage charged in the first snubber capacitor is reduced, and, simultaneously, an amount of current that conducts through the first snubber diode is reduced, and the first snubber diode is short-circuited while the amount of the current that conducts through the first snubber diode is being reduced, and the second snubber diode conducts current when charging of the snubber capacitor is started.

13. A battery charger comprising:

a switching power supply device, wherein the switching power supply device comprises:

a full-bridge circuit comprising a plurality of switching devices;

a transformer comprising a primary coil and a secondary coil, the primary coil being connected to an output of the full-bridge circuit;

a DC/DC converter comprising a plurality of diodes and a rectifier circuit, the rectifier circuit being connected to the secondary coil to rectify voltage outputted from the secondary coil; and a snubber circuit comprising a first snubber diode connected to an intermediate point of the secondary coil, a second snubber diode connected in series with the first snubber diode, the second snubber diode being connected to one end of an output capacitor, and a snubber capacitor connected between a node between the first and second snubber diodes and a positive side output of the rectifier circuit; and an AC/DC converter connected to an alternating power supply, wherein the AC/DC converter rectifies AC power into DC direct current power and supplies the rectified DC power to an input of the DC/DC converter.

* * * * *